US009742805B2

(12) United States Patent
Touboul et al.

(10) Patent No.: US 9,742,805 B2
(45) Date of Patent: Aug. 22, 2017

(54) MANAGING DYNAMIC DECEPTIVE ENVIRONMENTS

(71) Applicant: Illusive Networks Ltd., Tel Aviv (IL)

(72) Inventors: Shlomo Touboul, Kfar Chaim (IL); Hanan Levin, Tel Aviv (IL); Stephane Roubach, Herzliya (IL); Assaf Mischari, Petach Tikva (IL); Itai Ben David, Tel Aviv (IL); Itay Avraham, Tel Aviv (IL); Adi Ozer, Shoham (IL); Chen Kazaz, Tel Aviv (IL); Ofer Israeli, Tel Aviv (IL); Olga Vingurt, Shderot (IL); Liad Gareh, Herzliya (IL); Israel Grimberg, Ra'anana (IL); Cobby Cohen, Tel Aviv (IL); Sharon Sultan, Tel Aviv (IL); Matan Kubovsky, Tel Aviv (IL)

(73) Assignee: ILLUSIVE NETWORKS LTD., Tel Aviv (IL)

( * ) Notice: Subject to any disclaimer, the term of this patent is extended or adjusted under 35 U.S.C. 154(b) by 0 days.

(21) Appl. No.: 15/406,731

(22) Filed: Jan. 15, 2017

(65) Prior Publication Data

US 2017/0134421 A1    May 11, 2017

Related U.S. Application Data

(63) Continuation of application No. 15/175,048, filed on Jun. 7, 2016, now Pat. No. 9,553,886.
(Continued)

(51) Int. Cl.
*H04L 29/06* (2006.01)
*G06N 99/00* (2010.01)

(52) U.S. Cl.
CPC ....... *H04L 63/1491* (2013.01); *G06N 99/005* (2013.01); *H04L 63/1425* (2013.01); *H04L 63/20* (2013.01)

(58) Field of Classification Search
CPC . H04L 63/1491; H04L 63/20; H04L 63/1425; G06N 99/005
See application file for complete search history.

(56) References Cited

U.S. PATENT DOCUMENTS

| 6,363,489 B1 | 3/2002 | Comay et al. |
| 6,618,709 B1 | 9/2003 | Sneeringer |

(Continued)

FOREIGN PATENT DOCUMENTS

| WO | 2006131124 A1 | 12/2006 |
| WO | 2015047555 A1 | 4/2015 |

OTHER PUBLICATIONS

Wikipedia, Active Directory, https://en.wikipedia.org/wiki/Active_Directory, Jun. 24, 2015.
(Continued)

*Primary Examiner* — Darren B Schwartz
(74) *Attorney, Agent, or Firm* — Soquel Group I.P Ltd

(57) ABSTRACT

A deception management system (DMS) to detect attackers within a network of computer resources, including a discovery tool auto-learning the network naming conventions for user names, workstation names, server names and shared folder names, and a deception deployer generating one or more decoy attack vectors in the one or more resources in the network based on the network conventions learned by the discovery tool, so that the decoy attack vectors conform with the network conventions, wherein an attack vector is an object in a first resource of the network that has a potential to lead an attacker to access or discover a second resource of the network.

12 Claims, 7 Drawing Sheets

Related U.S. Application Data

(60) Provisional application No. 62/172,251, filed on Jun. 8, 2015, provisional application No. 62/172,253, filed on Jun. 8, 2015, provisional application No. 62/172,255, filed on Jun. 8, 2015, provisional application No. 62/172,259, filed on Jun. 8, 2015, provisional application No. 62/172,261, filed on Jun. 8, 2015.

(56) References Cited

U.S. PATENT DOCUMENTS

| | | | |
|---|---|---|---|
| 7,065,657 B1* | 6/2006 | Moran | H04L 63/1425 726/5 |
| 7,089,589 B2 | 8/2006 | Chefalas et al. | |
| 7,093,291 B2 | 8/2006 | Bailey | |
| 7,574,741 B2 | 8/2009 | Aviani et al. | |
| 7,636,944 B2 | 12/2009 | Raikar | |
| 7,665,134 B1 | 2/2010 | Hernacki et al. | |
| 7,694,339 B2 | 4/2010 | Blake et al. | |
| 7,725,937 B1 | 5/2010 | Levy | |
| 7,752,664 B1 | 7/2010 | Satish et al. | |
| 7,945,953 B1 | 5/2011 | Salinas et al. | |
| 8,181,249 B2 | 5/2012 | Chow et al. | |
| 8,181,250 B2 | 5/2012 | Rafalovich et al. | |
| 8,250,654 B1* | 8/2012 | Kennedy | H04L 41/22 713/187 |
| 8,375,447 B2 | 2/2013 | Amoroso et al. | |
| 8,499,348 B1 | 7/2013 | Rubin | |
| 8,528,091 B2 | 9/2013 | Bowen et al. | |
| 8,549,642 B2 | 10/2013 | Lee | |
| 8,549,643 B1 | 10/2013 | Shou | |
| 8,719,938 B2 | 5/2014 | Chasko et al. | |
| 8,739,281 B2 | 5/2014 | Wang et al. | |
| 8,739,284 B1 | 5/2014 | Gardner | |
| 8,769,684 B2 | 7/2014 | Stolfo et al. | |
| 8,819,825 B2 | 8/2014 | Keromytis et al. | |
| 8,856,928 B1 | 10/2014 | Rivner et al. | |
| 8,925,080 B2* | 12/2014 | Hebert | H04L 63/145 726/23 |
| 9,009,829 B2 | 4/2015 | Stolfo et al. | |
| 9,124,622 B1* | 9/2015 | Falkowitz | H04L 63/1416 |
| 9,152,808 B1 | 10/2015 | Ramalingam et al. | |
| 9,240,976 B1 | 1/2016 | Murchison | |
| 9,325,728 B1* | 4/2016 | Kennedy | H04L 63/1433 |
| 9,356,942 B1 | 5/2016 | Joffe | |
| 9,495,188 B1* | 11/2016 | Ettema | G06F 9/45533 |
| 2002/0066034 A1 | 5/2002 | Schlossberg et al. | |
| 2003/0084349 A1 | 5/2003 | Friedrichs et al. | |
| 2004/0088581 A1* | 5/2004 | Brawn | H04L 63/1433 726/25 |
| 2004/0160903 A1 | 8/2004 | Gai et al. | |
| 2005/0114711 A1* | 5/2005 | Hesselink | H04L 63/0209 726/4 |
| 2005/0132206 A1* | 6/2005 | Palliyil | G06F 21/566 713/188 |
| 2005/0149480 A1* | 7/2005 | Deshpande | G06F 17/30067 |
| 2005/0235360 A1 | 10/2005 | Pearson | |
| 2006/0041761 A1* | 2/2006 | Neumann | G06F 21/32 713/189 |
| 2006/0101516 A1* | 5/2006 | Sudaharan | H04L 63/0263 726/23 |
| 2006/0161982 A1 | 7/2006 | Chari et al. | |
| 2006/0224677 A1 | 10/2006 | Ishikawa et al. | |
| 2006/0242701 A1 | 10/2006 | Black et al. | |
| 2007/0028301 A1 | 2/2007 | Shull et al. | |
| 2007/0157315 A1 | 7/2007 | Moran | |
| 2007/0192853 A1 | 8/2007 | Shraim et al. | |
| 2008/0016570 A1 | 1/2008 | Capalik | |
| 2008/0086773 A1 | 4/2008 | Tuvell et al. | |
| 2008/0155693 A1 | 6/2008 | Mikan et al. | |
| 2009/0019547 A1 | 1/2009 | Palliyil et al. | |
| 2009/0144827 A1 | 6/2009 | Peinado et al. | |
| 2009/0222920 A1 | 9/2009 | Chow et al. | |
| 2009/0241191 A1 | 9/2009 | Keromytis et al. | |
| 2009/0241196 A1 | 9/2009 | Troyansky et al. | |
| 2009/0328216 A1 | 12/2009 | Rafalovich et al. | |
| 2010/0071051 A1 | 3/2010 | Choyi et al. | |
| 2010/0077483 A1* | 3/2010 | Stolfo | G06F 21/554 726/24 |
| 2010/0251369 A1 | 9/2010 | Grant | |
| 2011/0016527 A1* | 1/2011 | Yanovsky | H04L 63/1408 726/23 |
| 2011/0167494 A1 | 7/2011 | Bowen et al. | |
| 2011/0214182 A1 | 9/2011 | Adams et al. | |
| 2011/0307705 A1* | 12/2011 | Fielder | G06F 21/62 713/181 |
| 2012/0005756 A1 | 1/2012 | Hoefelmeyer et al. | |
| 2012/0084866 A1* | 4/2012 | Stolfo | G06F 21/554 726/25 |
| 2012/0167208 A1 | 6/2012 | Buford et al. | |
| 2012/0210388 A1* | 8/2012 | Kolishchak | G06F 21/552 726/1 |
| 2012/0246724 A1 | 9/2012 | Sheymov et al. | |
| 2012/0311703 A1 | 12/2012 | Yanovsky et al. | |
| 2013/0061055 A1 | 3/2013 | Schibuk | |
| 2013/0086691 A1* | 4/2013 | Fielder | G06F 21/78 726/26 |
| 2013/0212644 A1 | 8/2013 | Hughes et al. | |
| 2013/0227697 A1 | 8/2013 | Zandani | |
| 2013/0263226 A1* | 10/2013 | Sudia | H04L 63/1466 726/4 |
| 2014/0101724 A1 | 4/2014 | Wick et al. | |
| 2014/0115706 A1 | 4/2014 | Silva et al. | |
| 2014/0201836 A1 | 7/2014 | Amsler | |
| 2014/0208401 A1 | 7/2014 | Balakrishnan et al. | |
| 2014/0259095 A1 | 9/2014 | Bryant | |
| 2014/0310770 A1 | 10/2014 | Mahaffey | |
| 2014/0337978 A1 | 11/2014 | Keromytis et al. | |
| 2014/0359708 A1 | 12/2014 | Schwartz | |
| 2015/0007326 A1 | 1/2015 | Mooring et al. | |
| 2015/0013006 A1 | 1/2015 | Shulman et al. | |
| 2015/0047032 A1 | 2/2015 | Hannis et al. | |
| 2015/0074750 A1 | 3/2015 | Pearcy et al. | |
| 2015/0074811 A1 | 3/2015 | Capalik | |
| 2015/0096048 A1 | 4/2015 | Zhang et al. | |
| 2015/0128246 A1 | 5/2015 | Feghali et al. | |
| 2015/0326587 A1* | 11/2015 | Vissamsetty | H04L 63/1408 726/23 |
| 2016/0019395 A1 | 1/2016 | Ramalingam et al. | |
| 2016/0212167 A1 | 7/2016 | Dotan et al. | |
| 2016/0261608 A1* | 9/2016 | Hu | H04L 63/126 |

OTHER PUBLICATIONS

Wikpedia, Apple Filing Protocol, https://en.wikipedia.org/wiki/Apple_Filing_Protocol, Aug. 14, 2015.
Wikipedia, DMZ (computing), https://en.wikipedia.org/wiki/DMZ_(computing), Jun. 17, 2015.
Wikipedia, Domain Name System, https://en.wikipedia.org/wiki/Domain_Name_System, Jul. 14, 2015.
Wikipedia, Firewall (computing), https://en.wikipedia.org/wiki/Firewall_(computing), Jul. 14, 2015.
Wikipedia, Honeypot (computing), https://en.wikipedia.org/wiki/Honeypot_(computing), Jun. 21, 2015.
Wikipedia, Kerberos (protocol), https://en.wikipedia.org/wiki/Kerberos_(protocol), Jun. 30, 2015.
Wikipedia, Lightweight Directory Access Protocol, https://en.wikipedia.org/wiki/Lightweight_Directory_Access_Protocol, Aug. 15, 2015.
Wikipedia, LM hash, https://en.wikipedia.org/wiki/LM_hash, Jun. 8, 2015.
Wikipedia, RADIUS, https://en.wikipedia.org/wiki/RADIUS, Aug. 16, 2015.
Wikipedia, Rainbow table, https://en.wikipedia.org/wiki/Rainbow_table, Jul. 14, 2015.
Wikipedia, Secure Shell, https://en.wikipedia.org/wiki/Honeypot_(computing), Jul. 12, 2015.
Wikipedia, Security Information and Event Management, hilps://en.wikipedia.org/wiki/Security_information_and_event_management, Jun. 23, 2015.

(56) References Cited

OTHER PUBLICATIONS

Wikipedia, Tarpit (networking), https://en.wikipedia.org/wiki/Tarpit_(networking), Jul. 3, 2014.
U.S. Appl. No. 15/004,904, Non-Final Rejection, May 27, 2016, 16 pages.
U.S. Appl. No. 15/175,050, Non-Final Rejection, Aug. 19, 2016, 34 pages.
U.S. Appl. No. 15/175,050, Final Rejection, Nov. 30, 2016, 31 pages.
PCT Application No. PCT/IL16/50103, International Search Report and Written Opinion, May 26, 2016, 9 pages.
PCT Application No. PCT/IL16/50579, International Search Report and Written Opinion, Sep. 30, 2016, 7 pages.
PCT Application No. PCT/IL16/50581, International Search Report and Written Opinion, Nov. 29, 2016, 10 pages.
PCT Application No. PCT/IL16/50582, International Search Report and Written Opinion, Nov. 16, 2016, 11 pages.
PCT Application No. PCT/IL16/50583, International Search Report and Written Opinion, Dec. 8, 2016, 10 pages.

\* cited by examiner

FIG. 3

☑ PLANT DOMAIN                                                                 STATUS: ON

BROWSERS

THE BROWSERS DECEPTION FAMILY PRODUCES DECEPTIVE INFORMATION RELATING TO DOMAIN WEB HOSTS. THE DECEPTIONS ADDED HERE TEMPT AN ATTACKER TO ACCESS A NON-EXISTING WEB SERVER. THIS ACCESS ATTEMPT TRIGGERS AN ALERT THAT EXPOSES THE ATTACKER'S ACTIVITY. ♀TIPS

BROWSER HISTORY

ADD DECEPTIONS THAT MASQUERADE AS WEB SERVERS (FOR EXAMPLE, THE COMPANY'S WEB PORTAL). ENTER SERVER NAMES TO BE PLANTED IN THE FORMAT HTTP://SERVER-NAME.ILUSIVE.NG.

PROTOCOL: [↕ HTTP://]

HOST NAME OR IP: [☐ HOST NAME OR IP:]

SERVER PATH: [         ]

[ADD]

■ HTTP://WIKI.ILUSIVE.NG/
■ HTTP://SHAREPOINT.ILUSIVE.NG/
■ HTTP://CRM.ILUSIVE.NG/
■ HTTP://TICKETS.ILUSIVE.NG/
■ HTTP://FINANCE.ILUSIVE.NG/
■ HTTP://FILE64.ILUSIVE.NG/

<DIVERSITY LEVEL ♀

—●——— RARE
———— ALWAYS
———○— NEVER
——○— NORMAL     } 370
———○— COMMON
———— ALWAYS

🔧 GENERATE ENTITIES

FIG.5

MANAGING DYNAMIC DECEPTIVE ENVIRONMENTS

CROSS REFERENCES TO RELATED APPLICATIONS

This application is a non-provisional of U.S. Provisional Application No. 62/172,251, entitled SYSTEM AND METHOD FOR CREATION, DEPLOYMENT AND MANAGEMENT OF AUGMENTED ATTACKER MAP, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen and Sharon Sultan, the contents of which are hereby incorporated herein in their entirety.

This application is a non-provisional of U.S. Provisional Application No. 62/172,253, entitled SYSTEM AND METHOD FOR MULTI-LEVEL DECEPTION MANAGEMENT AND DECEPTION SYSTEM FOR MALICIOUS ACTIONS IN A COMPUTER NETWORK, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen and Sharon Sultan, the contents of which are hereby incorporated herein in their entirety.

This application is a non-provisional of U.S. Provisional Application No. 62/172,255, entitled METHODS AND SYSTEMS TO DETECT, PREDICT AND/OR PREVENT AN ATTACKER'S NEXT ACTION IN A COMPROMISED NETWORK, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen and Sharon Sultan, the contents of which are hereby incorporated herein in their entirety.

This application is a non-provisional of U.S. Provisional Application No. 62/172,259, entitled MANAGING DYNAMIC DECEPTIVE ENVIRONMENTS, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen and Sharon Sultan, the contents of which are hereby incorporated herein in their entirety.

This application is a non-provisional of U.S. Provisional Application No. 62/172,261, entitled SYSTEMS AND METHODS FOR AUTOMATICALLY GENERATING NETWORK ENTITY GROUPS BASED ON ATTACK PARAMETERS AND/OR ASSIGNMENT OF AUTOMATICALLY GENERATED SECURITY POLICIES, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen and Sharon Sultan, the contents of which are hereby incorporated herein in their entirety.

FIELD OF THE INVENTION

The present invention relates to cyber security, and in particular to security against attackers.

BACKGROUND OF THE INVENTION

Reference is made to FIG. 1, which is a simplified diagram of a prior art enterprise network 100 connected to an external internet 10. Network 100 is shown generally with resources including computers 110, servers 120, switches and routers 130, and mobile devices 140 such as smart phones and tablets, for ease of presentation, although it will be appreciated by those skilled in the art that enterprise networks today are generally much more varied and complex and include other devices such as printers, phones and any Internet of Things objects. The various connections shown in FIG. 1 may be direct or indirect, wired or wireless communications, or a combination of wired and wireless connections. Computers 110 and servers 120 may be physical elements or logical elements, or a mix of physical and logical elements. Computers 110 and servers 120 may be physical or virtual machines. Computers 110 and servers 120 may be local, remote or cloud-based elements, or a mix of local, remote and cloud-based elements. Computers 110 may be client workstation computers. Servers 120 may be file transfer protocol (FTP) servers, email servers, structured query language (SQL) servers, secure shell (SSH) servers, and other database and application servers.

Access to computers 110 and servers 120 in network 100 may optionally be governed by an access governor 150, such as a directory service, that authorizes users to access computers 110 and servers 120 based on "credentials" and other methods of authentication. Access governor 150 may be a name directory, such as ACTIVE DIRECTORY® developed by Microsoft Corporation of Redmond, Wash., for WINDOWS® environments. Background information about ACTIVE DIRECTORY® is available at Wikipedia. Other access governors for WINDOWS and non-WINDOWS environments include inter alia Lightweight Directory Access Protocol (LDAP), Remote Authentication Dial-In User Service (RADIUS), and Apple Filing Protocol (AFP), formerly APPLETALK®, developed by Apple Inc. of Cupertino, Calif. Background information about LDAP, RADIUS and AFP is available at Wikipedia.

Access governor 150 may be one or more local machine access controllers. For networks that do not include an access governor, authentication may be performed by other servers 120. Alternatively, in lieu of access governor 150, resources of network 100 determine their local access rights.

Credentials for accessing computers 110 and servers 120 include inter alia server account credentials such as <address> <username> <password> for an FTP server, a database server, or an SSH server. Credentials for accessing computers 110 and servers 120 also include user login credentials <username> <password>, or <username> <ticket>, where "ticket" is an authentication ticket, such as a ticket for the Kerberos authentication protocol or NTLM hash used by Microsoft Corp., or login credentials via certificates or via another implementation used today or in the future. Background information about the Kerberos protocol and LM hashes is available at Wikipedia.

Access governor 150 may maintain a directory of computers 110, servers 120 and their users. Access governor 150 authorizes users and computers, assigns and enforces security policies, and installs and updates software.

Computers 110 may run a local or remote security service, which is an operating system process that verifies users logging in to computers, to single sign-on systems, and to credential storage systems.

Network 100 may include a security information and event management (SIEM) server 160, which provides real-time analysis of security alerts generated by network hardware and applications. Background information about SIEM is available at Wikipedia.

Network 100 may include a domain name system (DNS) server 170, or such other name service system, for translating domain names to IP addresses. Background information about DNS is available at Wikipedia.

Network 100 may include a firewall 180 located within a gateway between enterprise network 100 and external internet 10. Firewall 180 controls incoming and outgoing traffic for network 100. Background information about firewalls is available at Wikipedia.

One of the most prominent threats that organizations face is a targeted attack; i.e., an individual or group of individuals that attacks the organization for a specific purpose, such as stealing data, using data and systems, modifying data and systems, and sabotaging data and systems. Targeted attacks are carried out in multiple stages, typically including inter alia reconnaissance, penetration and lateral movement. Lateral movement involves orientation, movement and propagation, and includes establishing a foothold within the organization and expanding that foothold to additional systems within the organization.

In order to carry out the lateral movement stage, an attacker, whether a human being who is operating tools within the organization's network, or a tool with "learning" capabilities, learns information about the environment it is operating in, such as network topology, network devices and organization structure, learns "where can I go from my current location" and "how can I move from my current location to another location (privilege required)", learns implemented security solutions, learns applications that he can leverage, and then operates in accordance with that data.

An advanced attacker may use different attack techniques to enter a corporate network and to move laterally within the network in order to obtain his resource goals. The advanced attacker may begin with a workstation, server or any other network entity to start his lateral movement. He uses different methods to enter the network, including inter alia social engineering, existing exploits and vulnerabilities, and a Trojan horse or any other malware allowing him to control a first node or nodes.

Once an attacker has taken control of a first node in a corporate network, he uses different advanced attack techniques for orientation and propagation and discovery of additional ways to reach other network nodes in the corporate network. Attacker movement from node to node is performed via an "attack vector", which is an object discovered by the attacker, including inter alia an object in memory or storage of a first computer that may be used to access or discover a second computer.

Exemplary attack vectors include inter alia credentials of users with escalated privileges, existing shared location names stored on different servers and workstations, and details including the address and credentials of an FTP server, an email server, a database server or an SSH server. Attack vectors are often available to an attacker because a user did not log off from a workstation, did not log out of an application, or did not clear his cache. E.g., if a user contacted a help desk and gave a help desk administrator remote access to his workstation and if the help desk administrator did not properly log off from the remote access session to the user's workstation, then the help desk access credentials may still be stored in the user's local cache and available to the attacker. Similarly, if the user accessed a server, e.g., an FTP server, then the FTP account login parameters may be stored in the user's local cache or profile and available to the attacker.

Attack vectors enable inter alia a move from workstation A→server B based on a shared server host name and its credentials, connection to a different workstation using local admin credentials that reside on a current workstation, and connection to an FTP server using specific access credentials.

Whereas IT "sees" the logical and physical network topology, an attacker that lands on the first network node or nodes "sees" attack vectors that depart from that node and move laterally to other nodes. The attacker can move to such nodes and then follow "attack paths" by successively discovering attack vectors from node to node.

When the attacker implements such a discovery process on all nodes in the network, he will be able to "see" all attack vectors of the corporate network and generate a "complete attack map". Before the attacker discovers all attack vectors on network nodes and completes the discovery process, he generates a "current attack map" that is currently available to him.

An objective of the attacker is to discover an attack path that leads him to a target network node. The target may be a bank's authorized server that is used by the corporation for ordering bank account transfers of money, it may be an FTP server that updates the image of all corporate points of sale, it may be a server or workstation that stores confidential information such as source code and secret formulas of the corporation, or it may be any other network nodes that are of value to the attacker and are his "attack goal nodes".

When the attacker lands on the first node, but does not know how to reach the attack goal node, he generates a current attack map that leads to the attack goal node.

One method to defend against such attacks, termed "honeypots", is to plant and monitor bait resources, with the objective that the attacker learn of their existence and then consume those bait resources, and to notify an administrator of the malicious activity. Background information about honeypots is available at Wikipedia.

Conventional honeypot systems operate by monitoring access to a supervised element in a computer network, the supervised element being a fake server or a fake service. Access monitoring generates many false alerts, caused by non-malicious access from automatic monitoring systems and by user mistakes. Conventional systems try to mitigate this problem by adding a level of interactivity to the honeypot, and by performing behavioral analysis of suspected malware if it has infected the honeypot itself.

Deception systems are used by organizations in order to deceive attackers into making detectable actions. However, attackers attempt to detect and avoid deceptions. When persistent attackers fail to progress, they try again and again until they find a successful path. They do so by elements within the environment.

Conventional deception systems like honeypots are flawed by being static, which allows the attacker to learn of their deceptions in ways such as the following.

Found deceptions—if an attacker previously acted on deceptive data and was caught, he may know not to stumble upon that same deception again.

Static deceptions—enterprise environments change over time. Static deceptions that do not change with the enterprise environment stand out as being different and, as such, may indicate a deception fingerprint.

Stale deceptions—if an attacker finds a deception element that has not been active for a long time, the attacker identifies it as being deceptive and avoids it.

Unfit deceptions—if an attacker finds a deception element that does not fit the enterprise environment, or that does not conform to an enterprise convention, it may stand out as being different and, as such, may indicate a deception fingerprint.

Uniform deceptions—if an attacker finds a deception element that exists on all or most computers, it may stand out and as such, may indicate a deception fingerprint.

When creating and using deceptive environments used for deceiving attackers, it is important that the deceptive environment naturally fit in the enterprise network environment and change along with it. In this changing enterprise environment, static non-diversified and unchanging deceptive environments are not effective in deceiving, and hence deceptive environments need to become dynamic and to adapt to changes that occur in the enterprise environment.

SUMMARY

Embodiments of the present invention provide systems and methods for managing dynamic deceptive environments, which constantly adapt to changes that occur in the enterprise environment.

There is thus provided in accordance with an embodiment of the present invention a deception management system (DMS) to detect attackers within a dynamically changing network of resources, including a deployment governor dynamically designating a deception policy that includes one or more decoy attack vectors, one or more resources of a network in which the one or more decoy attack vectors are generated, and a schedule for generating the one or more decoy attack vectors in the one or more resources, wherein an attack vector is an object in a first resource that may be used to access or discover a second resource, and wherein the network of resources is dynamically changing, a deception deployer dynamically generating one or more decoy attack vectors on one or more resources in the network, in accordance with the current deception policy, a deception adaptor dynamically extracting characteristics of the network, and a deception diversifier dynamically triggering changes in the deception strategy, distribution and implementation, based on changes in the network as detected from the network characteristics extracted by the deception adaptor.

There is additionally provided in accordance with an embodiment of the present invention a method for detecting attackers within a dynamically changing network of resources, including repeatedly designating a current deception policy that includes one or more decoy attack vectors, one or more resources of a network in which the one or more decoy attack vectors are generated, and a schedule for generating the one or more decoy attack vectors in the one or more resources, wherein an attack vector is an object in a first resource that may be used to access or discover a second resource, and wherein the network of resources is dynamically changing, repeatedly generating one or more decoy attack vectors in one or more resources in the network, in accordance with the then current deception policy, repeatedly extracting characteristics of the network, and repeatedly triggering changes in the deception strategy, distribution and implementation, based on changes in the network as detected from the thus-extracted network characteristic.

There is further provided in accordance an embodiment of the present invention a method for detecting attackers within a dynamically changing network of resources, including planting a decoy attack vector in a resource in a computer network, the decoy attack vector being an object in memory or storage of the resource that may be used to access or identify a decoy server, the decoy server being a fake resource in the network, repeatedly extracting an activity log of the decoy server, and repeatedly changing the activity log so as to make the decoy server appear dynamically active with the network.

BRIEF DESCRIPTION OF THE DRAWINGS

The present invention will be more fully understood and appreciated from the following detailed description, taken in conjunction with the drawings in which:

FIG. 3 is a screenshot of a user interface for configuring Files deceptions, in accordance with an embodiment of the present invention;

FIG. 5 is a screenshot of a user interface for configuring deceptions for browser history, in accordance with an embodiment of the present invention;

For reference to the figures, the following index of elements and their numerals is provided. Similarly numbered elements represent elements of the same type, but they need not be identical elements.

Table of elements in the figures

| Element | Description |
|---|---|
| 10 | Internet |
| 100 | enterprise network |
| 110 | network computers |
| 120 | network servers |
| 130 | network switches and routers |
| 140 | mobile devices |
| 150 | access governor (optional) |
| 252 | forensic alert module |
| 160 | SIEM server |
| 170 | DNS server |
| 180 | firewall |
| 200 | enterprise network with network surveillance |
| 220 | database of decoy attack vectors |
| 230 | policy database |
| 240 | decoy servers |
| 242 | forensic alert module |
| 260 | update server |
| 300 | deception management server |
| 310 | deployment governor |
| 320 | deception deployer |
| 330 | deception adaptor |
| 340 | deception diversifier |
| 341 | change profiler |
| 343 | change policy manager |
| 345 | change policy assigner |
| 347 | change policy scheduler |
| 349 | change policy deployer |

-continued

Table of elements in the figures

| Element | Description |
|---|---|
| 350 | deployment monitor |
| 360 | attack risk inspector |
| 370 | deception diversity sliders |

Elements numbered in the 1000's are operations of flow charts.

DETAILED DESCRIPTION

In accordance with embodiments of the present invention, systems and methods are provided for dynamically managing deception policies for an enterprise network, which adapt to changes that occur in the network environment.

Figure 1:
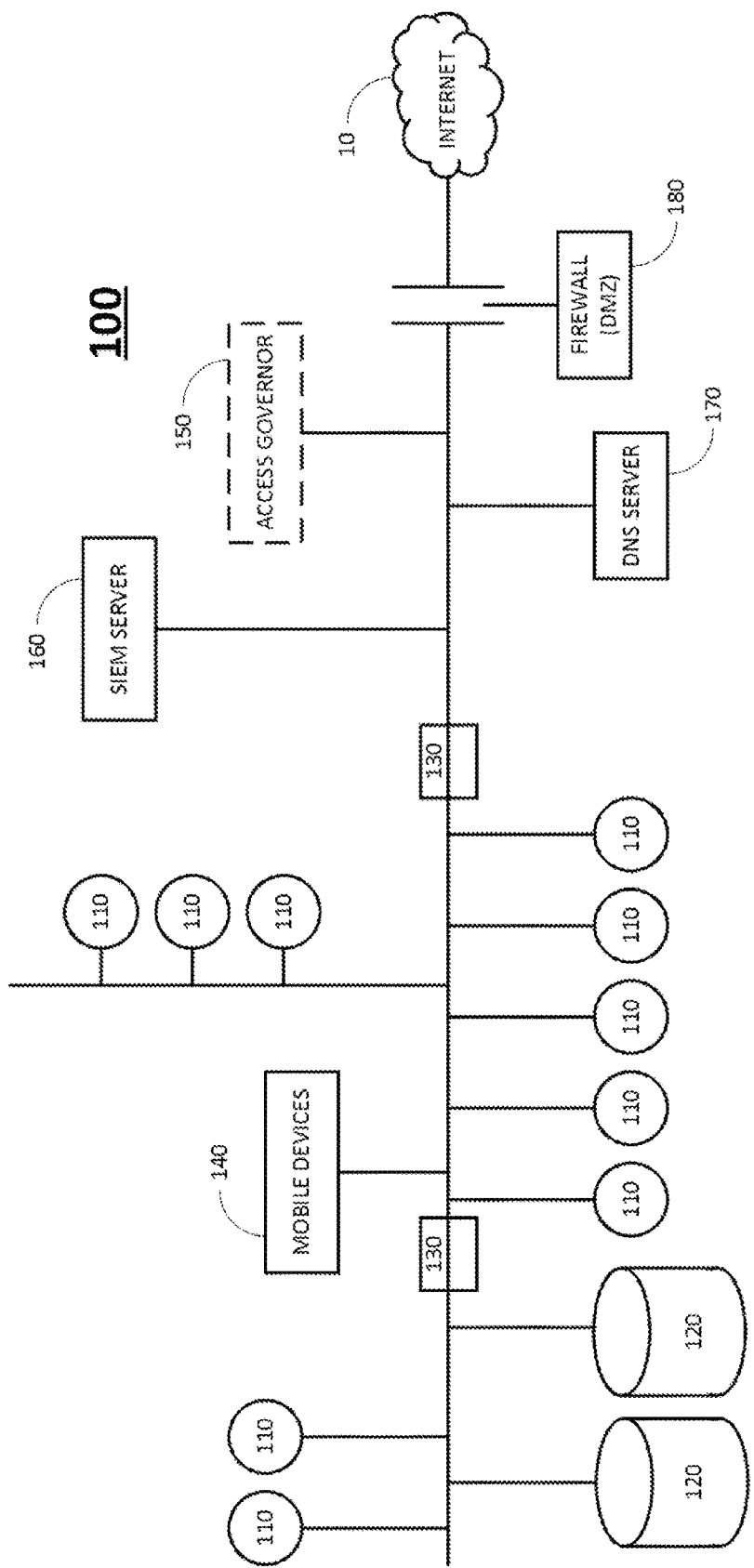
FIG. 1 is a simplified diagram of a prior art enterprise network connected to an external internet.
Figure 2:
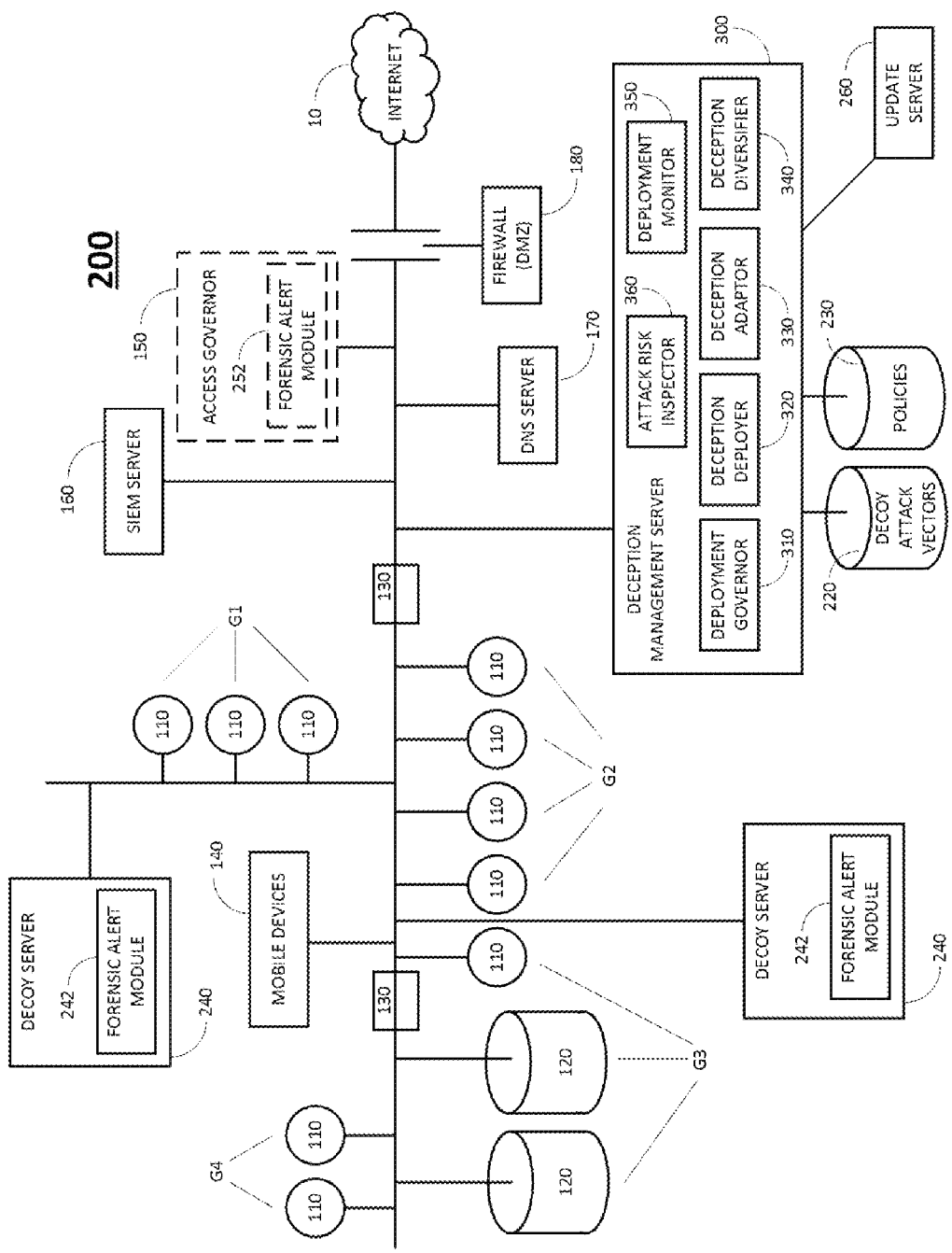
FIG. 2 is a simplified diagram of an enterprise network with network surveillance, in accordance with an embodiment of the present invention.

Reference is made to FIG. 2, which is a simplified diagram of an enterprise network 200 with network surveillance, in accordance with an embodiment of the present invention. Network 200 includes a deception management server 300, a database 220 of decoy attack vectors, a policy database 230 and decoy servers 240. In addition, network computers 110 and servers 120 are grouped into groups G1, G2, G3 and G4.

Database 220 stores attack vectors that fake movement and access to computers 110, servers 120 and other resources in network 200. Attack vectors include inter alia:
user names of the form <username>
user credentials of the form <username> <password>
user credentials of the form <username> <hash of password>
user credentials of the form <username> <ticket>
FTP server addresses of the form <FTP address>
FTP server credentials of the form <FTP address> <username> <password>
SSH server addresses of the form <SSH address>
SSH server credentials of the form <SSH address> <username> <password>
shared location addresses of the form <SMB address>

Each decoy attack vector in database 220 may point to (i) a real resource that exists within network 200, e.g., an FTP server, (ii) a decoy resource that exists within network 200, e.g., a decoy server 240, or (iii) a resource that does not exist. In the latter case, when an attacker attempts to access a resource that does not exist, access governor 150 recognizes a pointer to a resource that is non-existent. Access governor 150 responds by notifying deception management server 300, or by re-directing the pointer to a resource that does exist in order to track the attacker's moves, or both.

The attack vectors stored in database 220 are categorized by families, such as inter alia F1—user credentials
F2—files
F3—connections
F4—FTP logins
F5—SSH logins
F6—shared location names
F7—databases
F8—network devices
F9—URLs
F10—Remote Desktop Protocol (RDP)
F11—recent commands
F12—scanners
F13—cookies
F14—cache
F15—Virtual Private Network (VPN)
F16—key logger Credentials for a computer B that reside on a computer A provide an attack vector for an attacker from computer A to computer B.

Figure 3:
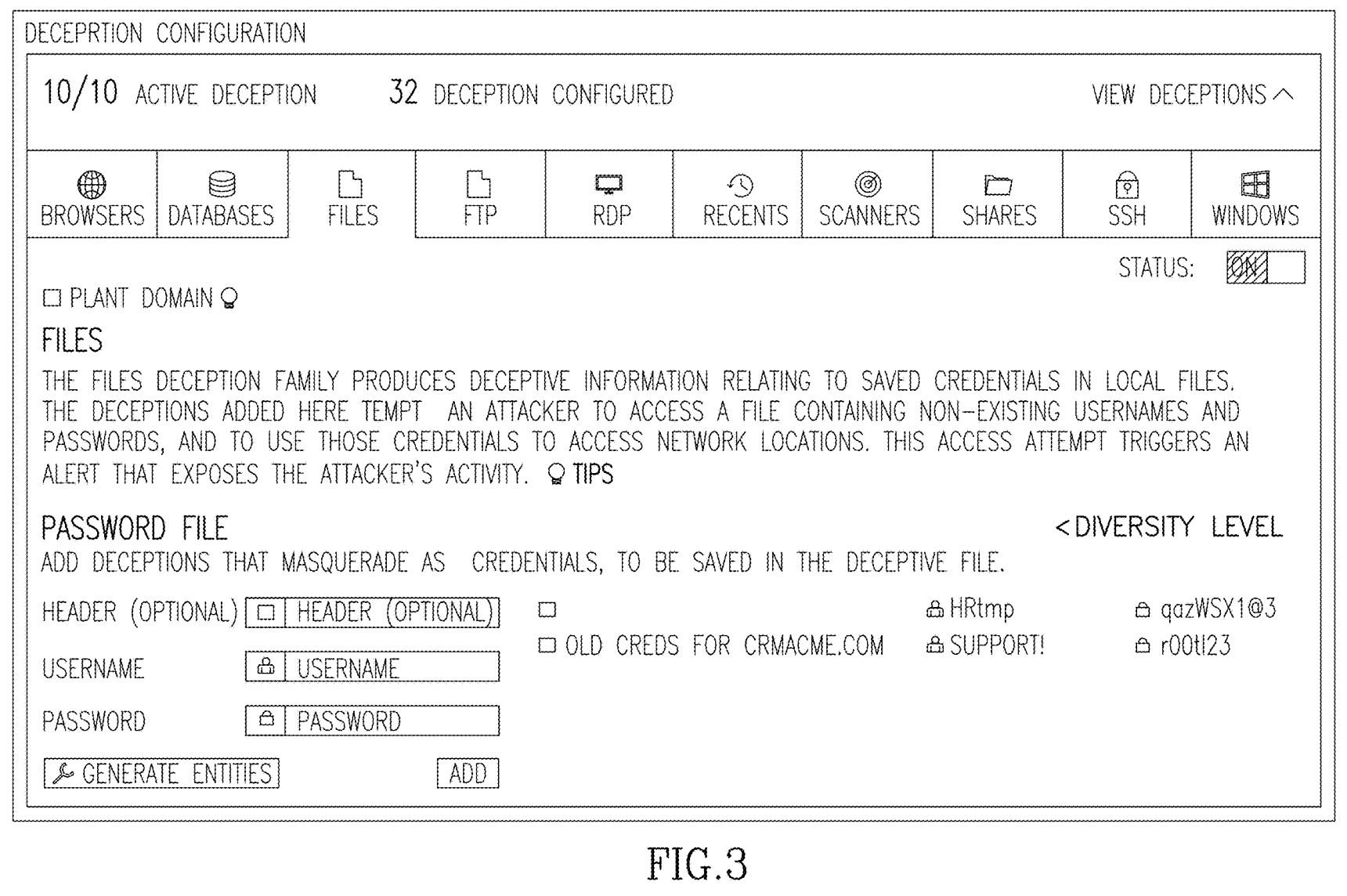

Reference is made to FIG. 3, which is a screenshot of a user interface for configuring Files deceptions, in accordance with an embodiment of the present invention. As shown in FIG. 3, decoy attack vectors for files comprise deceptive information relating to saved credentials in local files. The decoy attack vectors tempt an attacker to access a file of decoy usernames and passwords, and to use those credentials to access network resources. The access attempt triggers an alert that exposes the attacker's activity.

Database 220 communicates with an update server 260, which updates database 220 as new types of attack vectors for accessing, manipulating and hopping to computers evolve over time. Update server 260 may be a separate server, or a part of deception management server 300.

Policy database 230 stores, for each group of computers, G1, G2, . . . , policies for generating decoy attack vectors on computers in that group. Each policy specifies decoy attack vectors that are generated in each group, in accordance with attack vectors stored in database 220. For user credentials, the decoy attack vectors planted on a computer lead to another resource in the network. For attack vectors to access an FTP or other server, the decoy attack vectors planted on a computer lead to a decoy server 240.

Deception management server 300 includes six primary components; namely, a deployment governor 310, a deception deployer 320, a deception adaptor 330, a deception diversifier 340, a deployment monitor 350 and an attack risk inspector 360. Deployment governor 310 defines a deception policy. The deception policy defines different deception types, different deception combinations, response procedures, notification services, and assignments of policies to specific network nodes, network users, groups of nodes or users or both. The deception policy specifies one or more decoy attack vectors; one or more resources in network 200 in which the one or more decoy attack vectors are "planted", i.e., generated; and a schedule for generating the one or more decoy attack vectors in the one or more resources.

Once policies are defined, they are stored in policy database 230 with the defined assignments.

Deception deployer 320 plants one or more decoy attack vectors on one or more resources in network 200, in accordance with the deception policy specified by deployment governor 310. Deception deployer 320 plants each decoy, based on its type, on network resources, as appropriate. Deception deployer 320 plants the decoy attack vectors in such a way that the chances of a valid user accessing the decoy attack vectors are low. Deception deployer 320 may or may not stay resident on resources.

Deception adaptor 330 is an environment discovery tool that auto-learns the enterprise environment, including inter alia conventions for usernames, workstation names, server names and shared folder names. Deception adaptor 330 analyzes the organization of network 200 and dynamically triggers changes in the deception policy based on changes in network 200. Deception adaptor 330 extracts characteristics of network 200 from multiple sources, including inter alia:
management tools, e.g., directories such as AD and LDAP;
asset management, e.g., Tivoli and HPOV;
configuration management, e.g., CMDB;
network management, e.g., Cisco Works and SDN;
user management;

tools—general and third party tools;
device management, e.g., endpoints, mobile devices, and Windows/Linux/Mac/iOS/Android servers;
applications, e.g., portal, FTP client, and database;
data, e.g., files and SharePoint.

Figure 4:
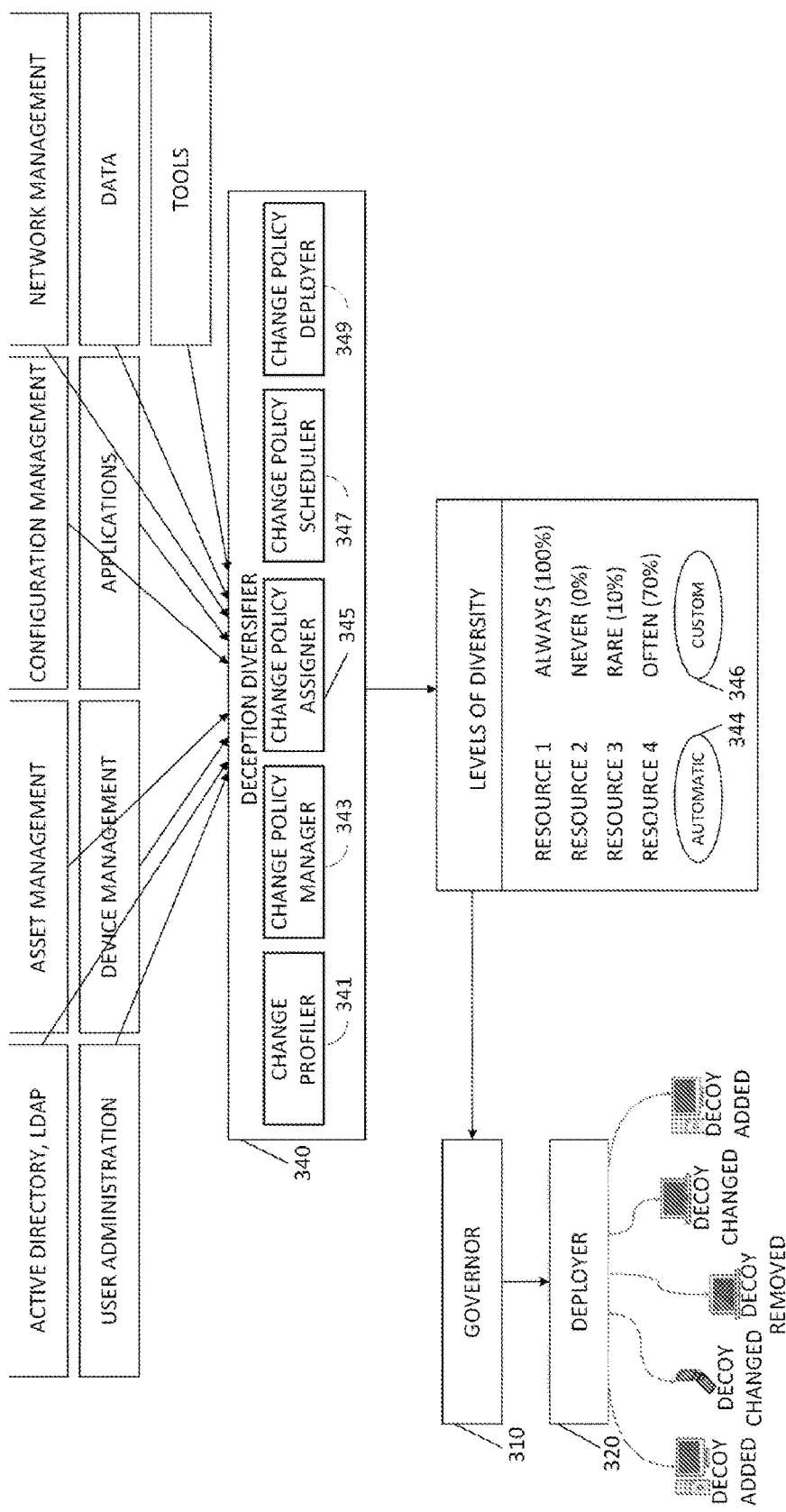
FIG. 4 is a simplified diagram of a deception diversifier, which specifies levels of deception diversity to be applied across resources in the network, in accordance with an embodiment of the present invention.

Reference is made to FIG. 4, which is a simplified diagram of deception diversifier 340, which specifies levels of deception diversity to be applied across resources in the network, in accordance with an embodiment of the present invention. Deception diversifier 340 generates a current view of the network from the characteristics extracted by deception adaptor 330 and, based on changes identified in the view, generates deception policy changes, including inter alia a specification of levels of deception diversity to be applied across resources in network 200, as shown in FIG. 4. The deception policy changes are provided to deception governor 310, and then deployed by deception deployer 320.

FIG. 4 shows respective options 344 and 346 for automatic and custom diversification. For the custom diversification option, the levels of diversification are set manually by an administrator of network 200. In an alternative embodiment of the present invention, the levels of diversification are randomly set.

Reference is made to FIG. 5, which is a screenshot of a user interface for configuring deceptions for browser history, in accordance with an embodiment of the present invention. As shown in FIG. 5, decoy attack vectors relate to web hosts in a domain. The decoy attack vectors lure an attacker to attempt to access decoy web servers. The access attempt triggers an alert that exposes the attacker's activity. Sliders 370 are used to set levels of deception diversity for the decoy web servers.

Figure 6:
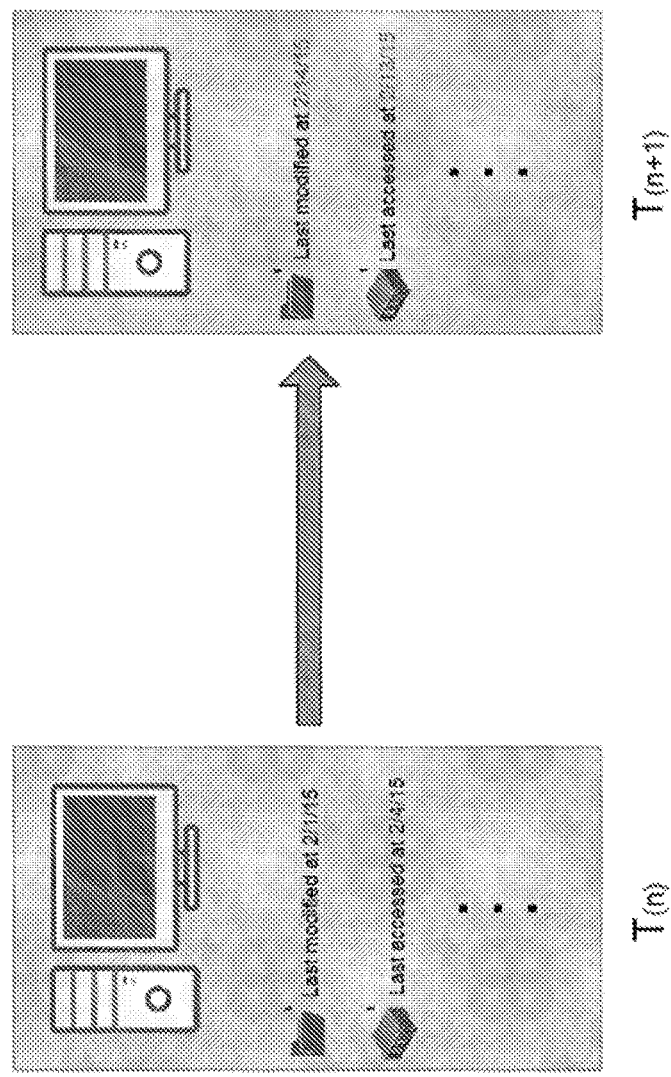
FIG. 6 is a simplified diagram of self-triggered deception changes, in accordance with an embodiment of the present invention.

Deception diversifier 340 responds to various change triggers extracted from the above sources. Changes in deception policy may be performed manually by an administrator, scheduled via policy governor 310, or performed autonomously. The need for change can be triggered by the environment, or can be self-triggered. Reference is made to FIG. 6, which is a simplified diagram of self-triggered deception changes, in accordance with an embodiment of the present invention. FIG. 6 shows an activity log of login access and data editing at a decoy resource, at a first point in time T(n). Deception adaptor 330 analyzes the activity logs and dynamically changes them as appropriate so that the decoy resource appears to an attacker as being active in enterprise network 200. E.g., FIG. 6 shows that the last modified time has been changed to 2/14/15, and the last accessed time has been changed to 2/13/15. The activity log at time T(n+1) appears as shown in FIG. 6 and, as such, the decoy resource appears to an attacker as being active.

Deception diversifier 340 includes five primary modules. A change profiler 341 analyzes changes in network 200 including inter alia changes in nature, entities, scope, form and naming convention. A change policy manager 343 defines deception deployment logic changes. A change policy assigner 345 defines deception deployment scope changes, such as on which network entities changes should be deployed. A change policy scheduler 347 defines deployment schedule changes. A change policy deployer 349 transmits changes to deception governor 310.

Deployment monitor 350 collects information about the current deployment of decoys across the network, and presents this information to an administrator of network 200 in an interactive way whereby the administrator is able to interactively change the deployment policy via deployment governor 310. In an embodiment of the present invention, deployment governor 310 uses deployment monitor 350 to automatically recommend changes to the administrator, so as to ensure that the enterprise always uses optimal fitted deceptions.

Attack risk inspector 360 inspects network 200 to search for real attack vectors that exist in network 200, and to find elements and artifacts in network 200 that can be used by an attacker as attack vectors, including inter alia credentials and connections to FTP, SSH and RDP servers. Based on the elements and artifacts found by attack risk inspector 360, deception governor 310 and deception diversifier 340 generate policies that resemble real attack vectors present in network 200, thereby ensuring that the deceptions deployed by deception deployer 340 are custom-fit in type, profile and ratio, to create an optimal deceptive environment.

Once an attacker is detected, a "response procedure" is launched. The response procedure includes inter alia various notifications to various tools, and actions on the source node where detection of use of a decoy has occurred, such as launching a forensics collection and investigation process, and isolating, shutting down and re-imaging one or more network nodes. The response procedure collects information available on one or more nodes that may help in identifying the attacker's attack acts, intention and progress.

Each decoy server 240 activates a forensic alert module 242, which alerts deception management server 300 that an attacker is accessing the decoy server via a computer 110 on the network. Access governor 150 also activates a forensic alert module 252, which alerts deception management server 300 that an attacker is attempting to use a decoy credential.

Notification servers (not shown) are notified when an attacker uses a decoy. The notification servers may discover this by themselves, or by using information stored on access governor 150 and SIEM 160. The notification servers forward notifications, or results of processing multiple notifications, to create notification time lines or other such analytics.

Figure 7:
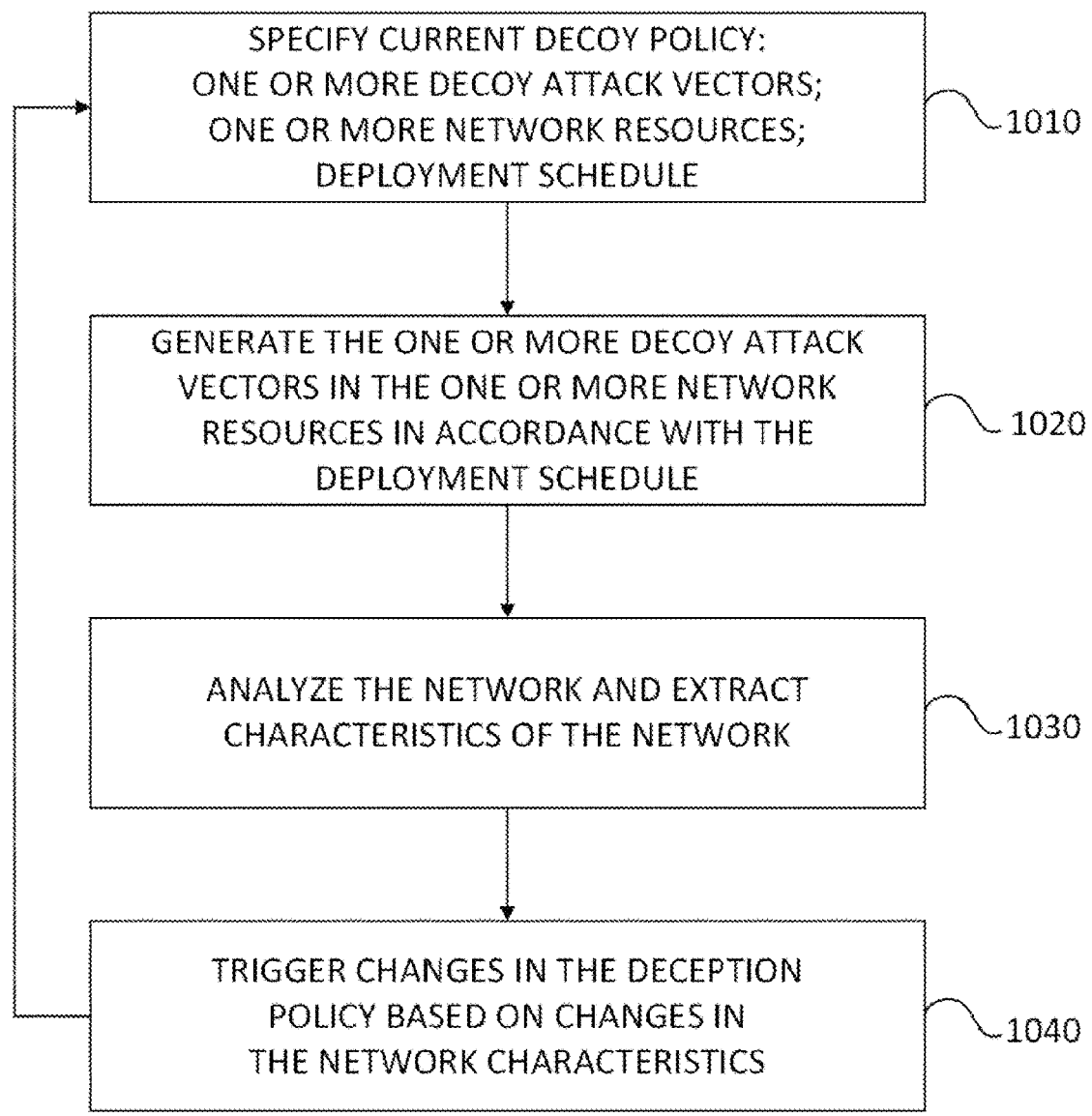
FIG. 7 is a simplified flowchart of a method for deception management in an enterprise network, in accordance with an embodiment of the present invention.

Reference is made to FIG. 7, which is a simplified flowchart of a method for deception management in network 200, in accordance with an embodiment of the present invention. Operations 1010-1040 shown in FIG. 7 are performed repeatedly over time. At operation 1010 a deception management server, such as deception management server 300, specifies a current deception policy that includes (i) one or more decoy attack vectors, (ii) one or more resources from network 200, and a deployment schedule. At operation 1020 the deception management server generates the one or more decoy attack vectors in the one or more resources in network 200 in accordance with the deployment schedule. At operation 1030 the deception management server analyzes network 200 for changes in the network, and extracts current characteristics of the network. At operation 1040 the deception management server triggers changes in the deception policy based on the changes in the network characteristics identified at operation 1030.

Deception management server 300 also monitors network 200 for decoy attack vectors that were improperly deployed or that were removed from one or more resources, e.g., when a machine is re-booted, and regenerates those decoy attack vectors on those resources.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. A deception management system (DMS) to detect attackers within a network of computer resources, comprising:
- a deception deployer planting one or more decoy attack vectors in memory or storage of one or more real resources in the network, an attack vector, of the one or more decoy attack vectors, being an object in a real resource of the network that has a potential to lead an attacker to access or discover a decoy resource of the network;
- a deception adaptor self-triggering modification of activity logs of login access and data editing for one or more decoy resources, the one or more decoy resources appearing to the attacker as being active in the network; and
- an access governor authorizing access to resources in the network, and issuing a notification upon recognizing an attempt to access one or more of the decoy resources of the network via one or more of the decoy attack vectors planted by said deception deployer.

2. The DMS of claim 1 wherein said deception deployer generates the one or more decoy resources.

3. The DMS of claim 1 further comprising a discovery tool inspecting the network to find real attack vectors that exist in real resources of the network and that have a potential to lead the attacker to access or discover other real resources of the network, and wherein said deception deployer plants decoy attack vectors that resemble the real attack vectors found by said discovery tool.

4. The DMS of claim 3 wherein said discovery tool learns characteristics of the network comprising at least one member of management tools, asset management, configuration management, user management, device management, installed applications, tools and data, and wherein the one or more decoy attack vectors planted by said deception deployer conform with the network characteristics.

5. The DMS of claim 4, wherein said discovery tool learns the characteristics of the network based on information extracted from one or more of the following network resource management and administration modules: directory access, user management, asset management, configuration management, resource management, device management, storage management, application management, and file management.

6. The DMS of claim 1, wherein the one or more decoy attack vectors planted by said deception deployer include at least one member of
- a username and a password,
- an RDP (Remote Desktop Protocol) username and a password,
- a username and an authentication ticket,
- an FTP (File Transfer Protocol) server address and a username and a password,
- a database server address and a username and a password, and
- an SSH (Secure Shell) server address and a username and a password.

7. A method for detecting attackers within a network of computer resources, comprising:
- planting one or more decoy attack vectors in memory or storage of one or more real resources in the network, an attack vector, of the one or more decoy attacked vectors, being an object in a real resource of the network that has a potential to lead an attacker to access or discover a decoy resource of the network;
- self-triggering modification of activity logs of login access and data editing for one or more decoy resources, the one or more decoy resources appearing to the attacker as being active in the network; and
- issuing a notification upon recognizing an attempt to access one or more of the decoy resources of the network via one or more of the decoy attack vectors planted by said planting.

8. The method of claim 7 further comprising generating the one or more decoy resources.

9. The method of claim 7 further comprising inspecting the network to find real attack vectors that exist in real resources of the network and that have a potential to lead the attacker to access or discover other real resources of the network, and wherein said planting plants decoy attack vectors that resemble the real attack vectors found by said inspecting.

10. The method of claim 7 further comprising learning characteristics of the network comprising at least one member of management tools, asset management, configuration management, user management, device management, installed applications, tools and data, and wherein the one or more decoy attack vectors planted by said planting conform with the network characteristics.

11. The method of claim 10, wherein said learning learns the characteristics of the network based on information extracted from one or more of the following network resource management and administration modules: directory access, user management, asset management, configuration management, resource management, device management, storage management, application management, and file management.

12. The method of claim 7, wherein the one or more decoy attack vectors planted by said planting include at least one member of
- a username and a password,
- an RDP (Remote Desktop Protocol) username and a password,
- a username and an authentication ticket,
- an FTP (File Transfer Protocol) server address and a username and a password,
- a database server address and a username and a password, and
- an SSH (Secure Shell) server address and a username and a password.

* * * * *